(12) United States Patent
Witters et al.

(10) Patent No.: US 8,284,881 B2
(45) Date of Patent: Oct. 9, 2012

(54) DATA INTERFACE AND METHOD OF SEEKING SYNCHRONIZATION

(75) Inventors: Davy Witters, Leuven (BE); Jo Frisson, Hoegaarden (BE); Steven De Cuyper, Brasschaat (BE); James Joseph McCormack, Eindhoven (NL)

(73) Assignee: NXP B.V., Eindhoven (NL)

( * ) Notice: Subject to any disclaimer, the term of this patent is extended or adjusted under 35 U.S.C. 154(b) by 944 days.

(21) Appl. No.: 12/092,143

(22) PCT Filed: Oct. 30, 2006

(86) PCT No.: PCT/IB2006/054014
§ 371 (c)(1),
(2), (4) Date: Oct. 15, 2008

(87) PCT Pub. No.: WO2007/052212
PCT Pub. Date: May 10, 2007

(65) Prior Publication Data
US 2009/0220036 A1    Sep. 3, 2009

(30) Foreign Application Priority Data

Nov. 3, 2005 (EP) .................................. 05110292
Oct. 30, 2006 (WO) ................ PCT/IB2006/054014

(51) Int. Cl.
*H04L 7/00* (2006.01)
(52) U.S. Cl. ...................................................... 375/354
(58) Field of Classification Search .................. 375/220, 375/354–355, 362; 370/503, 516
See application file for complete search history.

(56) References Cited

U.S. PATENT DOCUMENTS

| | | | |
|---|---|---|---|
| 5,742,798 A * | 4/1998 | Goldrian ........................ 713/400 |
| 5,748,137 A | 5/1998 | d'Hont |
| 5,894,476 A * | 4/1999 | Fraser ......................... 370/395.1 |
| 6,182,175 B1 | 1/2001 | Nihouran |
| 6,536,025 B2 * | 3/2003 | Kennedy et al. ............... 327/144 |
| 6,895,062 B1 * | 5/2005 | Wilson ........................... 375/355 |
| 6,912,246 B1 * | 6/2005 | Arai ............................... 375/219 |
| 7,031,221 B2 * | 4/2006 | Mooney et al. ........... 365/230.05 |
| 7,054,356 B2 * | 5/2006 | Wahl .............................. 375/219 |
| 7,280,628 B1 * | 10/2007 | Gupta et al. ................... 375/355 |
| 7,471,755 B2 * | 12/2008 | Carballo ....................... 375/355 |
| 7,688,925 B2 * | 3/2010 | Lee et al. ....................... 375/355 |
| 2003/0131160 A1 | 7/2003 | Hampel et al. |
| 2005/0163203 A1 | 7/2005 | Ware et al. |
| 2006/0023825 A1 * | 2/2006 | Kato et al. ..................... 375/372 |

* cited by examiner

*Primary Examiner* — Khanh C Tran

(57) ABSTRACT

The present invention provides for method of seeking synchronization at a data interface between a transmitting element and a receiving element, and to related transmitting and receiving elements of the interface, in which the clock frequency of both elements is the same but which exhibit a phase difference, also known as mesochronous clock domains, the method including the steps of, prior to data transfer at the interface, delivering a strobe signal generated at the transmitting element to the receiving element, generating a strobe signal at the receiving element and synchronizing the same to the strobe signal received from the transmitting element, and maintaining the synchronized strobe signal generated at the receiving element for the sampling of data appearing at the interface from the transmitting element.

17 Claims, 7 Drawing Sheets

DATA INTERFACE AND METHOD OF SEEKING SYNCHRONIZATION

The present invention relates to a method of seeking synchronization at a data interface and to an interface formed generally between the flip-flops of a transmitting element and the flip-flops of a receiving element.

In the field of digital micro-electronics in particular, interfaces are commonly employed for the transfer of data between a transmitting element and a receiving element and such interfaces can be generally categorized as one of three types depending generally upon the clock-relationship between flip-flops on the transmitting side and flip-flops on the receiving side.

First there are the so-called synchronous interfaces in which the flip-flops on both the transmitting and receiving sides run from the same balanced clock domain, i.e. clock domains that are both equal in frequency and phase.

In contrast, so-called asynchronous interfaces employ flip-flops at the transmitting and receiving sides that run on different clocks having no frequency-relationship.

A further form of interface is provided in relation to flip-flops on the transmitting and receiving side that are arranged to run at the same clock frequency, but wherein an unknown, though generally fixed, phase difference exists between the clock frequencies.

The present invention relates to interfaces of this third type.

With such interfaces, and indeed interfaces in general, it has also been identified that the number of connection lines provided at the interface can sometimes prove limited, or alternatively are required to be limited in an attempt, for example, to limit the number of connection pins on an integrated circuit that must be provided for the required transfer of data and for control of the timing relationship between the respective integrated circuits of the transmitting and receiving sides to the interface.

The nature of the interface to which the present invention relates, i.e. that employing clock signal frequencies having differing, although fixed, phases, generally employs a strobe signal which accompanies the data transferred via the interface and which serves to achieve appropriate phase-synchronization between the transmitting and receiving sides of the interface.

Such strobe signals currently require their own data lines and integrated circuit pin connections and this can prove disadvantageously limiting in situations where it can be desirable to reduce the total number of integrated circuit pins required by the interface, or where only a limited number of integrated circuit pins are in any case available at the interface.

The present invention seeks to provide for a method of achieving synchronization at a data interface between elements operating at a common clock frequency but exhibiting a phase difference and which exhibits advantages over known such methods, and also to related transmitting and receiving elements of the interface.

According to one aspect of the present invention, there is provided a method of seeking synchronization at a data interface between a transmitting element and a receiving element, the clock frequency of both elements being the same but exhibiting a phase difference, the method including the steps of, prior to data transfer at the interface:

delivering a strobe signal generated at the transmitting element to the receiving element;

generating a strobe signal at the receiving element and synchronizing the same to the strobe signal received from the transmitting element;

maintaining the synchronized strobe signal generated at the receiving element for the sampling of data appearing at the interface from the transmitting element.

The method of the present invention can prove advantageous in that, through avoiding the need to transfer the strobe signal at the time of data transfer, the number of integrated circuit pins required at the interface can be advantageously reduced.

Such an advantage is generally achieved by replacing the physical strobe signal arising in the current art by means of a virtual strobe signal generated, and maintained, at the receiving element during an initialization sequence at the interface.

The present invention advantageously therefore makes it possible to reliably transfer data via an interface between elements operating at a common clock frequency, but exhibiting a phase difference, and wherein the interface need only provide the requisite number of parallel collections as are required for the number of data lines of the transmitting and receiving elements.

Advantageously, the generation of the strobe signal at the transmitting element is achieved by flywheeling.

In particular, the strobe signal generated at the transmitting element is arranged also to control subsequent data transfer to the receiving element via the interface.

In particular, the strobe signal generated at the transmitting element is delivered to the receiving element by way of a connection arranged to be employed during the subsequent data transfer.

According to one particular embodiment, the strobe signal generated at the transmitting element is arranged to toggle every two clock cycles and on the same one of the four clock edges presented by such every second clock cycles.

Advantageously, the one of the four edges on which the strobe signal generated at the transmitting element toggles is arranged to comprise the clock edge employed to transfer data to the receiving element via the interface.

Advantageously, the strobe signal generated at the receiving element and synchronized to the strobe signal received from the transmitting element is generated and maintained by means of flywheeling.

It should therefore be appreciated that the strobe signal generated at the receiving element can be generated as part an initialization step achieved via the interface.

Preferably, the receiving element is arranged for monitoring the data lines from the interface for the receipt from the transmitting element.

The strobe signal generated at the receiving element advantageously comprises an internal interpolated strobe signal.

According to another aspect of the present invention, there is provided a transmitting element arranged for transmitting data to a receiving element interfaced thereto by way of a plurality of data lines, the clock frequency of both the transmitting and receiving elements being the same but exhibiting a phase difference and the transmitting element being arranged to generate a strobe signal and transmit the strobe signal to the receiving element by way of one of said data lines and before transmission of data thereon, the transmitting element further being arranged to control generation of said strobe signal subsequent to its transmission to the receiving element for the control of data transfer via the plurality of data lines to the receiving element.

As with the method discussed above, the transmitting element according to this aspect of the present invention proves particularly advantageous in that it readily allows for an initialization procedure to be conducted prior to data transfer but which is sufficient to establish at a receiving element a synchronized strobe signal and without requiring a dedicated connection pin at the transmitting element.

Thus, as discussed above, this aspect of the present invention can advantageously be arranged to generate the strobe signal by way of a flywheel arrangement and the strobe signal can be arranged to toggle every two clock cycles and on the same one of the four edges of such two such clock cycles.

According to another aspect of the present invention, there is provided a receiving element arranged for receiving data from a transmitting element interfaced thereto and by way of a plurality of data lines, the clock from the transmitting and receiving elements being the same but exhibiting a phase difference, the receiving element being arranged to receive a strobe signal from the transmitting element on one of the said plurality of data lines and prior to transfer of data thereon, and being arranged to generate a strobe signal synchronized to the received strobe signal, and maintaining the strobe signal generated therein for sampling of data appearing on the said plurality of data lines.

Again, through internal generation of the required strobe signal, the receiving element can be employed in relation to an interface in which no dedicated connection pin is required merely for transmission of the strobe signal.

The strobe signal is advantageously generated within the receiving element by means of a flywheel arrangement and the receiving element can further include means for monitoring for receipt of the strobe signal delivered from the transmitting element.

As will be appreciated in particular from the description that follows, the present invention can be provided in relation to any form of digital micro-electronics interface in particular between integrated circuit pairs such as those found within an optical triple writer system.

The invention is described further hereinafter by way of example only, with reference to the accompanying drawings in which.

Figure 1:
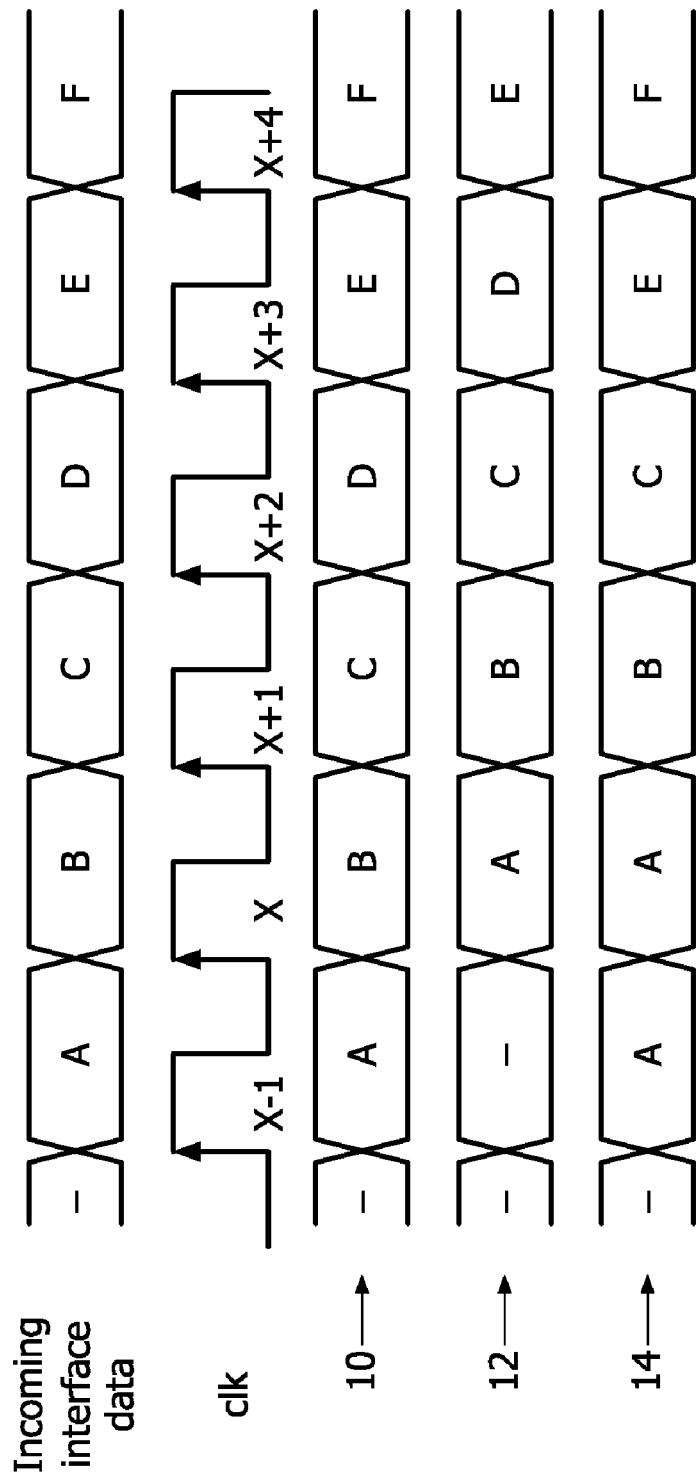
FIG. 1 is a timing diagram illustrating the relationship between data at an interface, and related clock signal as is known in the current art.

Turning first to FIG. 1, there is provided a timing diagram illustrating the problems found in the operation of current interfaces and which occasioned the requirement for a strobe signal such as that found in the current art and employed, in the particularly advantageous manner within the present invention. In particular, in FIG. 1 there is illustrated incoming interface data signal A-F and the related clock signals X−1 . . . X+4. There is also illustrated three 10, 12, 14 out of many possible results that can arise through unpredictable synchronization between the incoming interface data and the clock signals.

In further detail, since the phase-difference between the two clocks signals employed by an interface relating to the invention is unknown, there is a danger that data will be clocked-in by, for example, receiving flip-flops at or around the same moment as the data-input of these flip-flops changes. Thus, with reference to FIG. 1, assuming that the clock edge used to clock-in data to the flip-flops is X, on some occasions the data input will get loaded into the flip-flops at moment X, whereas on other occasions such data loading will only occur at X+1, i.e. the next clock edge. The unpredictable nature of such synchronization is illustrated by data traces 10, 12, 14, with data traces 12 and 14 illustrating the nature of errors that can arise.

In order to prevent such unpredictable behavior arising, it has been known to take two measures.

First, the receiving element of the interface is arranged to clock-in data at a higher clock frequency than the transmitting element of the interface and this ensures that for every new set of sent data bits, there is at least one safe sample moment at the receiving element. This of course requires a higher clock frequency which can be achieved by either one or more of up-multiplying the clock at the receiving element, arranging the receiving element to use both edges of the clock signal to clock-in the data and placing every two samples in parallel on the interface, i.e. effectively doubling the number of parallel data connection on the interface, such that the receiving element then needs to clock the data only once every two clock cycles.

Secondly, and of particular relevance to the present invention, in current interfaces the data is accompanied by a strobe signal that serves to indicate at which sample moment it is safe to clock-in the data at the receiving element of the interface.

As discussed above, the provision of this physical strobe signal in the current art requires a separate integrated circuit connection pin which can prove problematic particularly when the number of connection pins at an interface are limited or it is desired to provide for an interface with a reduced number of connection pins.

The present invention advantageously renders the implementation of a physical strobe signal unnecessary and, as discussed further below, replaces the requirement for a physical strobe signal with an initialization sequence which serves to create and maintain a synchronized virtual strobe signal at the receiving element of the interface.

Figure 2:
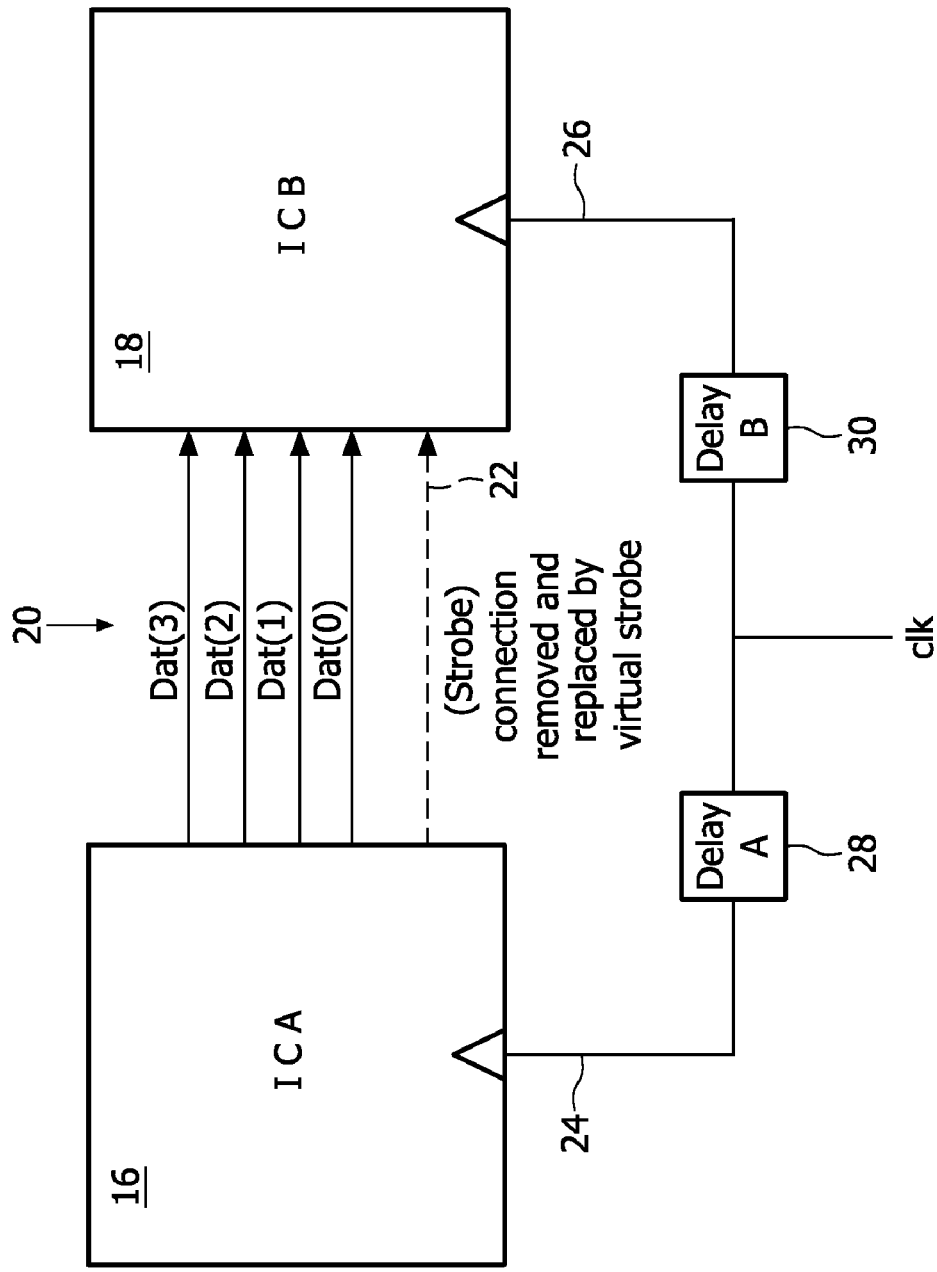
FIG. 2 is a schematic block diagram of an integrated circuit pair connected by way of an interface as found in the current art.

A comparison between an interface of the current art and that according to an aspect of the present invention is provided with reference to FIG. 2.

Referring to FIG. 2 there is illustrated an integrated circuit pair 16, 18 connected by way of an interface 20 comprising four data lines Dat (0)-Dat (3). Also illustrated as part of the interface 20 is a strobe signal line 22 which, while being present in prior art interfaces, is notably absent from the present invention.

Both of the integrated circuit pair 16, 18 run on the same clock signal clk 24, 26 respectively, however the clock signal arriving at integrated circuit 16 experiences a delay A as indicated at 28 while the clock signal arriving at integrated circuit 18 experiences a delay B as indicated at 30, wherein a delay A is different from delay B. In this manner, the clock signals arriving at the integrated circuit pair 16, 18 while of common frequency, exhibit a phase difference.

It should of course be appreciated that FIG. 2 is merely illustrative and the present invention is equally applicable to any interface requiring a strobe signal irrespective of the number parallel data lines provided and respective number of parallel data bits being transmitted.

As mentioned, the four parallel data lines Dat (0)-Dat (3) are used to transmit data from integrated circuit 16 to integrated circuit 18 and four new bits are transmitted via those four lines of the interface 20 every other clock cycle. Within the current art, the strobe signal is delivered by way of a dedicated line 22 which serves to indicate at integrated circuit 18 which sample-instance is the safest to clock-in the data appearing on the four data lines Dat (0)-Dat (3) of the interface 20.

FIG. 2 illustrates the specific disadvantage of the current art in that the strobe signal requires a separate line, and thus related integrated circuit pin connection, at the integrated circuit pair 16, 18.

This can prove particularly disadvantageous in situations where it is desired to limit the number of pin connections required, and somewhat limiting in situations where only a restrictive number of pin connections are available.

As is clarified below, the present invention advantageously allows for the provision of a strobe signal employed within the integrated circuit 18 to determine which sample-instance is the safest to clock-in data on the data lines of interface 20, but without requiring the separate strobe line 22 thereby advantageously reducing the number of integrated circuit pin connections that would otherwise be required.

In order to avoid the need to send a strobe signal along with the data during normal data transfer at the interface, the present invention advantageously allows for synchronization between the strobe signals at the transmitting and receiving sides of the interface prior to the start of data transfer.

Returning again to the schematic diagram of FIG. 2, this, in this illustrated embodiment, can be achieved as follows.

Integrated circuit 16 is arranged to send a strobe signal to integrated circuit 18 by way of one of the four data lines Dat (0)-Dat (3) of the interface 20. Software control can be arranged to select which one of the, for example, four data lines is chosen. The strobe signal itself is generated by integrated circuits 16 and is arranged to toggle every two clock cycles and on the same one of the four possible clock edges. The choice of the four clock edges is between the rising or falling edges of the even (E) or odd (O) clock cycles. It should be appreciated that the clock edge selected for the toggling of the strobe signal is the same one as will be employed later during data transfer when integrated circuit 16 places data on the four interface data lines Dat (0)-Dat (3).

The integrated circuit 18 on the receiving side of the interface is advantageously arranged to be programmable for the selection of the appropriate signal input line for the monitoring of the strobe signal.

When required, software control can trigger an initialization procedure in which an internal interpolated strobe signal generated inside integrated circuit 18 is synchronized with the strobe signal received on the selected one of the four data lines Dat (0)-Dat (3) of the interface 20 so as to allow for a flywheeling procedure to implement and maintain a virtual strobe signal at the receiving integrated circuit 18.

Once generated and implemented by such flywheeling, the internal interpolated strobe signal at integrated circuit 18 is employed to sample data arriving on the four data lines Dat (0)-Dat (3) of the interface 20, once the integrated circuit 16 has been placed in its normal data-transfer mode.

Advantageously, the interface 20 formed between the integrated circuit pair 16, 18 only requires re-initialization if one of the two sides to the interface is reset, or whenever the clock signal arriving at either of the two sides to the interface of the two elements to the interface falls away.

From the above it will be appreciated that the transmitting element of the interface, i.e. integrated circuit 16 illustrated in FIG. 2, is advantageously arranged to implement a simple flywheel that can determine at which clock edge, the strobe signal is generated and the data placed onto the interfaces updated, again with the choice being between even and odd clock cycles and the rising or falling edges thereof. It is considered that start-up behavior of integrated circuit 16 is not necessarily to be restricted to any particular one of the four clock edges. However, once a particular clock edge has been chosen, the implementation of the flywheel guarantees that the transmitting element of the interface, i.e. the integrated circuit 16 in FIG. 2, continues to be used at the same clock edge.

Likewise, the receiving element of the interface, i.e. integrated circuit 18, in the illustrated example, is advantageously arranged to comprise a simple flywheel arrangement that can determine which clock edge is employed for sampling data arriving at the four signal lines Dat (0)-Dat (3) of the interface 20, again a choice of one of the four edges arising at the even or odd clock signal and the rising or falling edge thereof. Appropriate initialization of the integrated circuit 18 forming the receiving element at the interface ensures that the safest clock edge for sampling-in the data in the four data lines is selected as will be described in greater detail below. Again, after the initialization procedure has been completed, the implementation of the flywheel arrangement serves to guarantee that the receiving element of the interface keeps to this particular clock edge when sampling the data appearing on the four data lines Dat (0)-Dat (3) of the interface 20.

Figure 3:
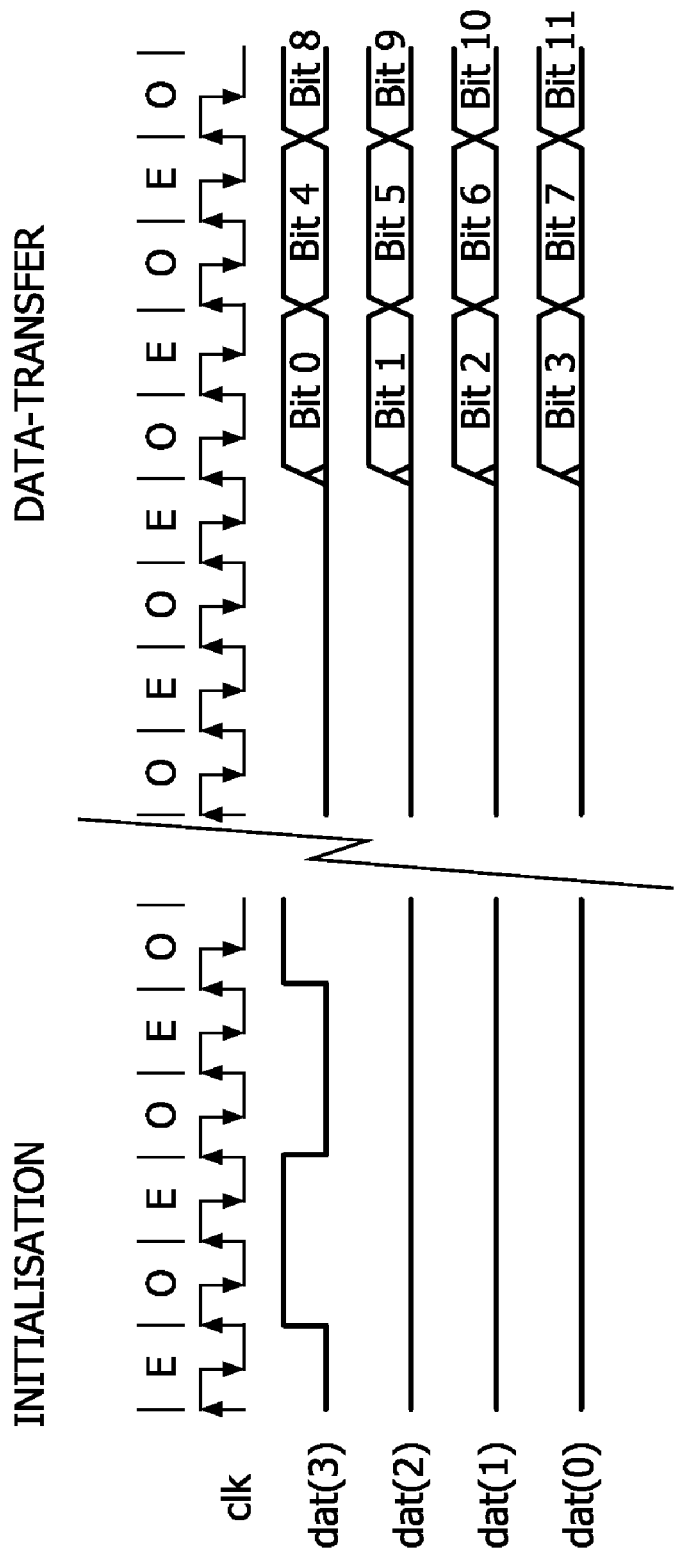
FIG. 3 is a timing diagram at an interface according to an embodiment of the present invention.

The above-mentioned timing relationship between the strobe signal and the data signals, as compared with the clock signal is illustrated further with reference to FIG. 3 and which illustrates generation of the strobe signal within, for example, the transmitting integrated circuit 16 forming the transmitting element of the interface, and subsequent placement of the data onto the four data lines Dat (0)-Dat (3) of the interface.

As will be appreciated, in the example illustrated in FIG. 3, it is determined that the strobe signal is placed on the Dat (3) data line and further that the strobe changes on the positive edge for each of the clock cycles. Thus, as noted above, the strobe signal toggles in every two clock cycles, i.e. every odd clock cycle (O) and, of the four possible clock edges chosen, it is the positive edge of each of those odd clock cycles (O) that is employed.

Subsequent to completion of the initialization phase, i.e. once the internal interpolated strobe signal generated within the integrated circuits 18 forming the receiving element of the interface has been established, the integrated circuit 16 is switched to a data-transfer mode as further illustrated in FIG. 3.

The series of bits transmitted across the four data lines Dat (0)-Dat (3) is illustrated and, importantly, it will be appreciated that each of the data bit signals toggles, as with the strobe signal originally generated during the initialization on signal line Dat (3), on the positive edge of each of the odd clock cycles.

It is important that, once the particular clock edge upon which the strobe signal toggles has been determined at the initialization phase, this particular clock edge is then employed for the toggling of the data bits as is clearly illustrated by comparison of the two sides of the timing diagram of FIG. 3.

As mentioned above, the strobe signal employed within the receiving element comprising the integrated circuit 18 serves to determine the safest sample instant at which data arriving at the interface can be clocked in.

Figure 4:
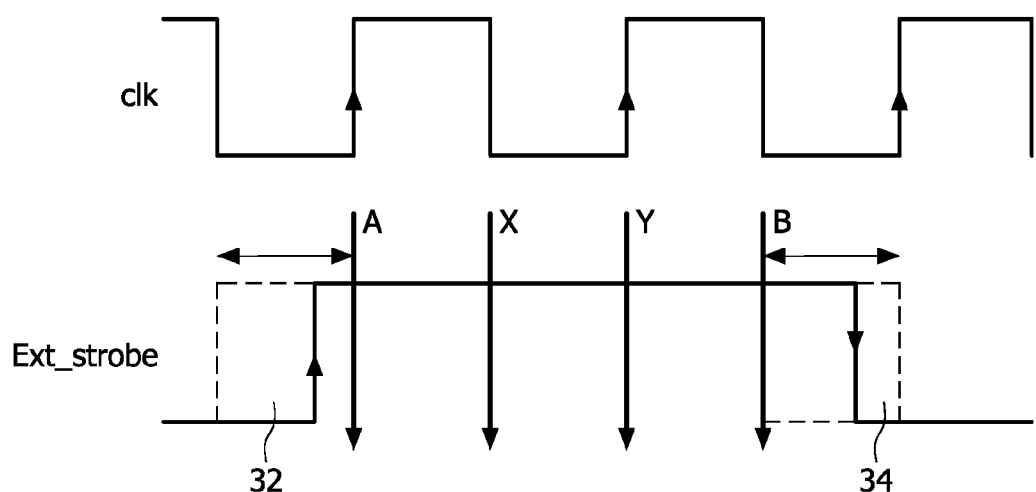
FIG. 4 is a timing diagram illustrating an operation within a receiving element embodying an aspect of the present invention.

The manner in which the present invention advantageously employs the virtual strobe signal arising in accordance with the invention is illustrated further with regard to FIG. 4.

FIG. 4 provides for a comparison between the clock signal and the external strobe signal as arriving at the receiving element of the interfaces. As discussed above, in this embodiment of the interface of the present invention the strobe and the data signal are arranged to toggle every other clock cycle. If, however, the strobe and data signals arriving at the receiving element of the interface, i.e. integrated circuit 18 in FIG. 2, appear on both the rising and falling edges of the clock, this would provide four sample-moments per strobe signal or data value. Since this would in turn provide a resolution of half of one clock period on the receiving side of the interface, it would prove impossible to reconstruct the received strobe signal with an accuracy greater than one half of a clock period. This likewise would introduce an uncertainty as to real rising and falling edges of the strobe and data signals arriving at integrated circuit 18. Such uncertainty is illustrated in FIG. 3 by means of timing period blocks 32, 34. Of the four sample moments indicated by arrows A, B, X, and Y, it is only the two central sample moments X, Y that can be considered "safe" since it is only these two sample instances that can guarantee that sampling occurs at least one half clock period away from a value change on the interface. As illustrated, it cannot be guaranteed that instances A and B will be less than half a clock cycle away and so there would be a risk if either one of those were to be adopted as the actual sample moment.

During the initialization procedure mentioned above, in order to correctly match the interpolated strobe signal arising at the receiving element with the strobe received from the transmitting element, it is necessary first to determine whether the strobe toggles in front of a falling edge of the clock signal, and whether such an edge forms part of an odd or even clock cycle.

Figure 5:
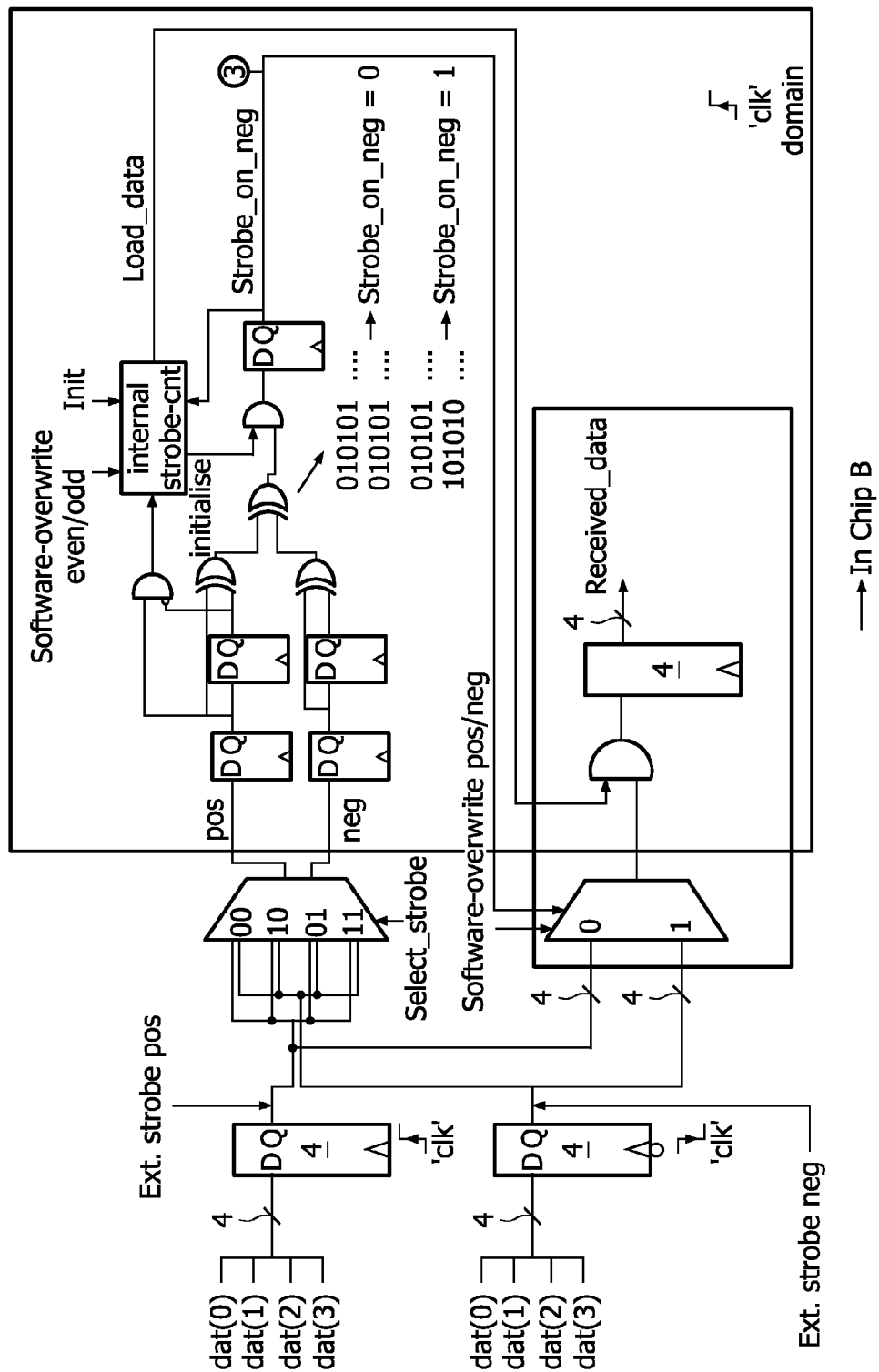
FIG. 5 is a schematic diagram of a receiving element of the interface according to an embodiment of one aspect of the present invention.

Turning now to FIG. 5, there is illustrated a schematic representation of the interface logic exhibited by one example of a receiving side of the interface, for example, the integrated circuit 18 of FIG. 2, of the present invention.

FIG. 5 in particular illustrates an XOR circuit implemented to determine whether the strobe, and thus the subsequent data, changes in front of a rising or behind a falling, edge of the clock signal clk. The result is stored on a strobe_on neg line whose output will be "0" if the strobe changes in front of a clock rising edge, or otherwise "1" if the strobe changes in front of a falling edge.

In order to determine if the clock edge was part of an even or odd clock cycle, a rising edge detection is implemented on the external strobe input. Yet further, and as illustrated in FIG. 5, the receiving element of the interface includes an internal strobe counter arranged to offer flywheeling so as to maintain the internal strobe once generated and appropriately synchronized to the external strobe. The internal strobe counter is arranged to count from 0-3 and then to wrap-around in order to achieve the required flywheeling. Importantly, the counter is arranged to increment on a rising clock edge only and, as noted becomes aligned with the received external strobe signal by conducting rising edge detection on that received strobe signal.

The alignment logic within the receiving element is implemented such that the counter is preset to "0" at the first rising edge of the clock after the rising edge on the external strobe signal has been identified.

The internal strobe counter, in combination with the strobe on neg variable arising at the output serves to define the sample moment such as Y (see FIG. 4) upon which it is considered safe to clock-in data from the interface Dat (0)-Dat (3) lines via the positive clock edge/negative clock edge synchronizers and into the data flip-flops at the receiver element.

As will be appreciated, there are two main cases with regard to the sampling moment at the receiving element of the interface, that is the data/strobe signal changing the half clock period before a clock rising edge, or that the data changes in the half clock period for the falling clock edge.

Figure 6:
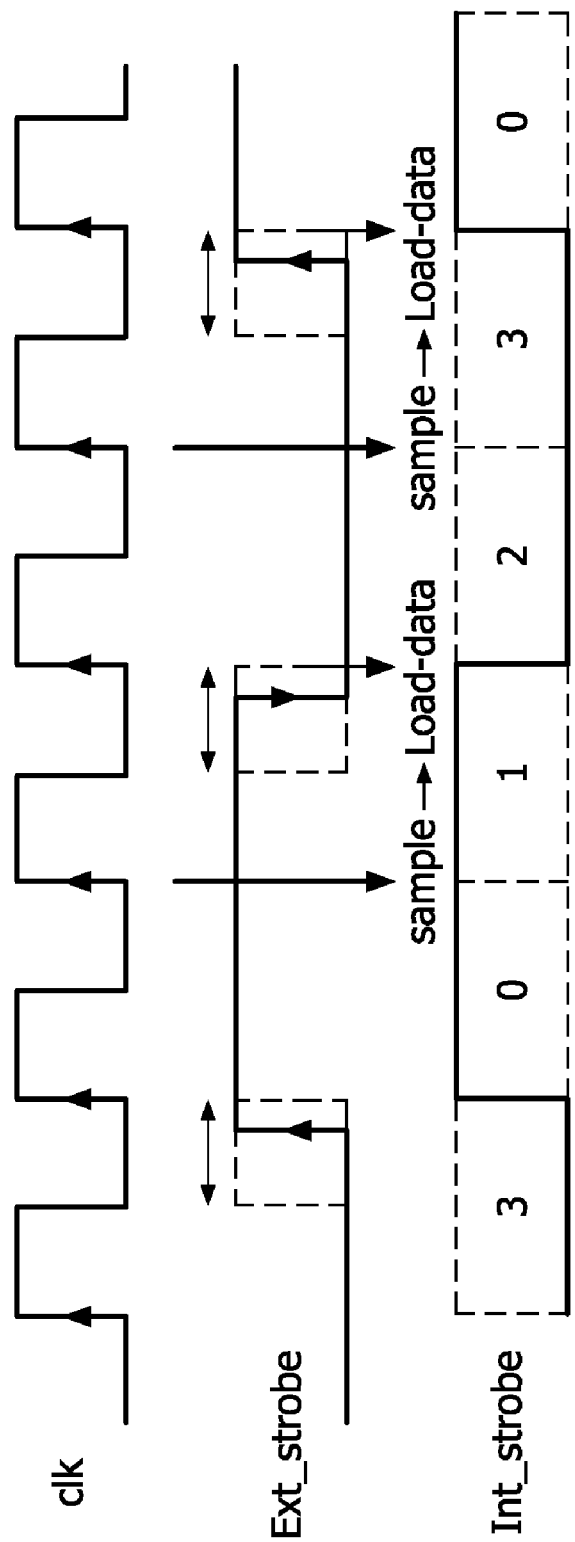
FIG. 6 is a timing diagram arising in relation to the receiving element of the interface.
Figure 7:
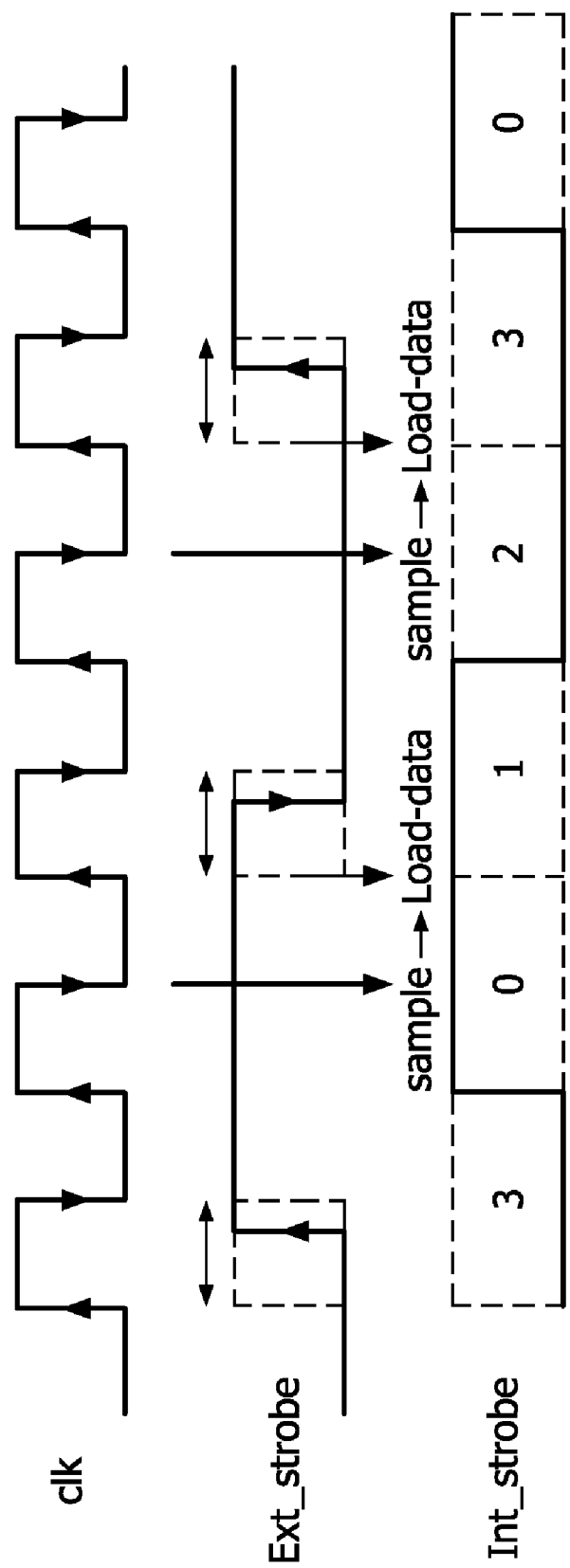
FIG. 7 is a further timing diagram arising in a receiving element of an interface embodying an aspect of the present invention.

FIG. 6 provides further illustration of a data strobe change arising before a clock rising edge whereas FIG. 7 provides further illustration of a data/change occurring before a falling clock edge.

Turning first to FIG. 6 there is provided a diagram illustrating a relationship between the clock signal, the external strobe signal as received at the receiving element and the internal strobe signal as interpolated at the receiving element.

Since, as indicated with reference to FIG. 5, the strobe/data is changing before a clock rising edge, the strobe_on_neg value will be "0" such that the data is arranged to be clocked-in on the rising edges of the clock and will then be transferred to the flip-flops of the receiver when the strobe count value equals a "0" or "3".

On the rising edge of the clock with the strobe count value at "1" or "3", the data is clocked into the data flip-flops of the receiver and this advantageously determines that the real sample-moment is a full clock cycle earlier as indicated in FIG. 6. Thus, this actual sample-moment is always at least one half clock period before the next data edge and, importantly, at least one clock period after the preceding data edge.

A similar relationship can arise in situations when the data/strobe is arranged to change before a clock falling edge as discussed further in relation to FIG. 7.

In this case, the strobe_on_neg value will of course be "1" and, as a result, data will be clocked-in to the receiving element on the falling edges of the clock, and will be transferred to the receiver element flip-flops when the strobe count is at a value "0" or "2".

Again, referring to FIG. 7, on the rising edge of the clock with a strobe count of value "0" or "2", the data is clocked into the receiver element data flip-flops and this means that the actual sample moment is in fact half a clock cycle earlier. This sample moment is illustrated in FIG. 7 and, as is clearly illustrated, is always at least half a clock period before the next data change and at least one clock period after the previous data change.

Such an arrangement as illustrated with reference to FIGS. 6 and 7 therefore advantageously ensures that a "safe" sampling moment is employed.

Although it works almost fully automatically, the interface can advantageously allow for a high level of monitoring and programmability.

As will be appreciated, the present invention can advantageously be applied in relation to any digital micro-electronics interface in which common clock signals exhibit a phase difference and, in particular, finds ready application in high speed optical writing systems such as blue laser systems and indeed triple writers operating as blue, red and infra-red systems.

For example, one of the integrated circuit pairs can comprise a 16×CD/DVDRW and with its basic DSP and the other can comprise and add-on companion IC allowing for a Blu-ray disc (BD) arrangement to be provided. The invention is then advantageously used to provide a reliable high speed interface from the companion integrated circuit to the main DSP which contains the special Low-Voltage Differential Signalling (LVDS) interface to the optical pick-up.

The invention claimed is:

1. A method of seeking synchronization at a data interface between a transmitting element and a receiving element, the clock frequency of both elements being the same but exhibiting a phase difference, the method including the steps of, prior to data transfer at the interface:

delivering a strobe signal generated at the transmitting element to the receiving element;

generating a strobe signal at the receiving element and synchronizing the same to the strobe signal received from the transmitting element;

maintaining the synchronized strobe signal generated at the receiving element for the sampling of data appearing at the interface from the transmitting element, wherein the strobe signal generated at the transmitting element is arranged to toggle every two clock cycles and on the same one of the four clock edges presented by such every two clock cycles.

2. A method as claimed in claim 1, wherein the one of the four edges on which the strobe signal generated at the transmitting element toggles is arranged to comprise the clock edge employed to transfer data to the receiving element via the interface.

3. A method as claimed in claim 2, wherein the strobe signal generated at the receiving element and synchronized to the strobe signal received from the transmitting element is generated and maintained by flywheeling.

4. A method as claimed in claim 3, wherein the receiving element is arranged for monitoring the data lines from the interface for the receipt of the strobe signal.

5. A method as claimed in claim 4, and including a determining step for determining if the received strobe signal toggles in front of a rising edge or in front of a falling edge of the clock signal.

6. A method as claimed in claim 5, wherein the determining step is conducted by way of an XOR circuit.

7. A method as claimed in claim 6, and including determining if the clock edge identified is part of an odd or even clock cycle by a rising edge detection on the received strobe signal.

8. A method as claimed in claim 7 and including determining if the clock edge is part of an even or an odd clock cycle by an internal strobe counter arranged for flywheeling.

9. A method as claimed in claim 8, wherein the internal strobe counter is arranged to increment on rising clock edges only.

10. A transmitting element arranged for transmitting data to a receiving element interfaced thereto by way of a plurality of data lines, the clock frequency of both the transmitting and receiving elements being the same but exhibiting a phase difference and the transmitting element being arranged to generate a strobe signal and transmit the strobe signal to the receiving element by way of one of said data lines and before transmission of data thereon, the transmitting element further being arranged to control generation of said strobe signal subsequent to its transmission to the receiving element for the control of data transfer via the plurality of data lines to the receiving element, wherein the strobe signal is arranged to toggle every two clock cycles and on the same one of the four edges of such two clock cycles.

11. A transmitting element as claimed in claim 10 and arranged to generate the strobe signal by way of a flywheel arrangement.

12. A receiving element arranged for receiving data from a transmitting element interfaced thereto and by way of a plurality of data lines, the clock from the transmitting and receiving elements being the same but exhibiting a phase difference, the receiving element being arranged to receive a strobe signal from the transmitting element on one of the said plurality of data lines and prior to transfer of data thereon, and being arranged to generate a strobe signal synchronized to the received strobe signal, and maintaining the strobe signal generated therein for sampling of data appearing on the said plurality of data lines, and arranged for determining if the strobe signal received from the transmitting element toggles in front of a rising edge, or in front of a falling edge, of the clock signal, wherein the determination of the moment of receipt of the strobe signal is conducted by way of an XOR circuit.

13. A receiving element as claimed in claim 12 and arranged such that the strobe signal is generated within the receiving element by a flywheel arrangement.

14. A receiving element as claimed in claim 12 wherein the receiving element further includes means for monitoring for receipt of the strobe signal delivered from the transmitting element.

15. A receiving element as claimed in claim 12, and arranged to determine if the clock edge identified is part of an odd or even clock cycle rising edge detection performed on the received strobe signal.

16. A receiving element as claimed in claim 15, and including an internal strobe counter for determining if the clock edge is part of an even or part of an odd clock cycle, the internal strobe counter being arranged for flywheeling.

17. A receiving element as claimed in claim 16, wherein the internal strobe counter is arranged to increment on rising clock edges only.

* * * * *